(12) United States Patent
Umeda et al.

(10) Patent No.: US 9,118,514 B2
(45) Date of Patent: Aug. 25, 2015

(54) RECEIVER AND SIGNAL PROCESSING METHOD

(71) Applicants: FUJITSU LIMITED, Kawasaki-shi, Kanagawa (JP); SOCIONEXT INC., Yokohama-shi, Kanagawa (JP)

(72) Inventors: Masataka Umeda, Yokohama (JP); Naoto Adachi, Yokohama (JP)

(73) Assignees: FUJITSU LIMITED, Kawasaki (JP); SOCIONEXT INC., Yokohama (JP)

( * ) Notice: Subject to any disclaimer, the term of this patent is extended or adjusted under 35 U.S.C. 154(b) by 0 days.

(21) Appl. No.: 14/183,191

(22) Filed: Feb. 18, 2014

(65) Prior Publication Data

US 2014/0294130 A1 Oct. 2, 2014

(30) Foreign Application Priority Data

Mar. 28, 2013 (JP) ................................. 2013-070347

(51) Int. Cl.
*H04L 25/02* (2006.01)
*H04B 17/336* (2015.01)

(52) U.S. Cl.
CPC .......... *H04L 25/0232* (2013.01); *H04B 17/336* (2015.01); *H04L 25/022* (2013.01)

(58) Field of Classification Search
CPC .............. H04L 25/0232; H04L 25/022; H04L 27/2647; H04L 25/0228; H04L 5/0007; H04L 25/03159; H04L 25/03821; H04L 27/2613; H04L 25/0244; H04L 5/0048; H04B 17/336
See application file for complete search history.

(56) References Cited

U.S. PATENT DOCUMENTS

| | | | | |
|---|---|---|---|---|
| 8,019,029 B1* | 9/2011 | Katic | ............................ | 375/346 |
| 8,451,918 B1* | 5/2013 | Cheng et al. | ................... | 375/260 |
| 8,902,831 B2* | 12/2014 | Kuchi et al. | .................... | 370/329 |
| 2004/0218520 A1* | 11/2004 | Aizawa | ........................ | 370/203 |
| 2007/0147525 A1* | 6/2007 | Song et al. | ..................... | 375/260 |
| 2010/0062705 A1* | 3/2010 | Rajkotia et al. | .................... | 455/1 |
| 2012/0219079 A1* | 8/2012 | Yoshimoto et al. | ........... | 375/260 |
| 2012/0327830 A1* | 12/2012 | Hamaguchi et al. | .......... | 370/311 |
| 2013/0003901 A1* | 1/2013 | Kato et al. | .................... | 375/341 |
| 2013/0128932 A1* | 5/2013 | Huang et al. | .................. | 375/219 |

FOREIGN PATENT DOCUMENTS

JP 2000-332727 A 11/2000

* cited by examiner

*Primary Examiner* — Hirdepal Singh
(74) *Attorney, Agent, or Firm* — Arent Fox LLP

(57) ABSTRACT

A receiver includes a detector to detect an interfered-with carrier from a received and demodulated signal, a fast Fourier transform computation part to perform fast Fourier transform to convert a time domain signal to a frequency domain signal and adjust an output power level of a desired carrier wave contained in the frequency domain signal based upon the detected interfered-with carrier, and a channel estimation part to estimate a channel characteristic based upon a non-interfered-with pilot signal that is not subject to influence of the interfered-with carrier and an interpolation value interpolated based upon the non-interfered-with pilot signal, the non-interfered-with pilot signal being obtained by removing, based upon the interfered-with carrier, an interfered-with pilot signal that is subject to the influence of the interfered-with carrier and an interpolation value interpolated based upon the interfered-with pilot signal.

16 Claims, 17 Drawing Sheets

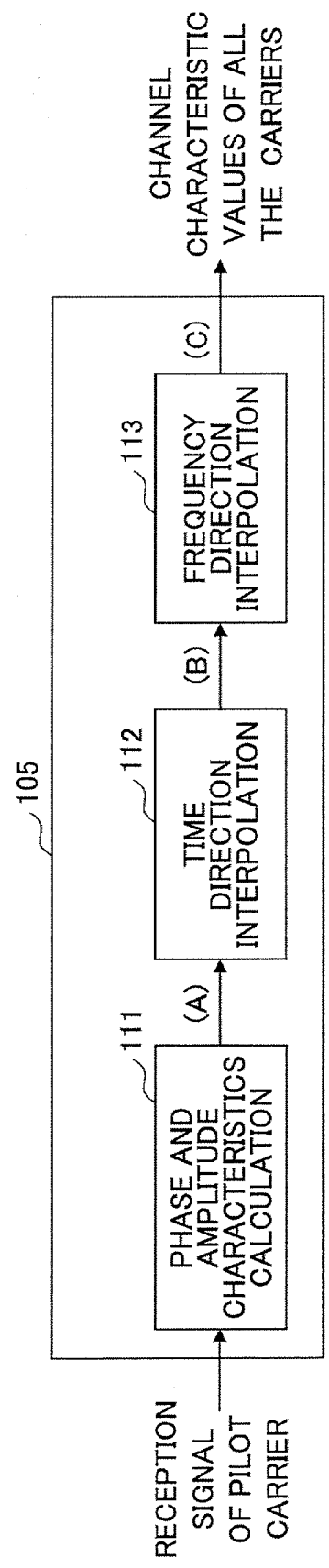

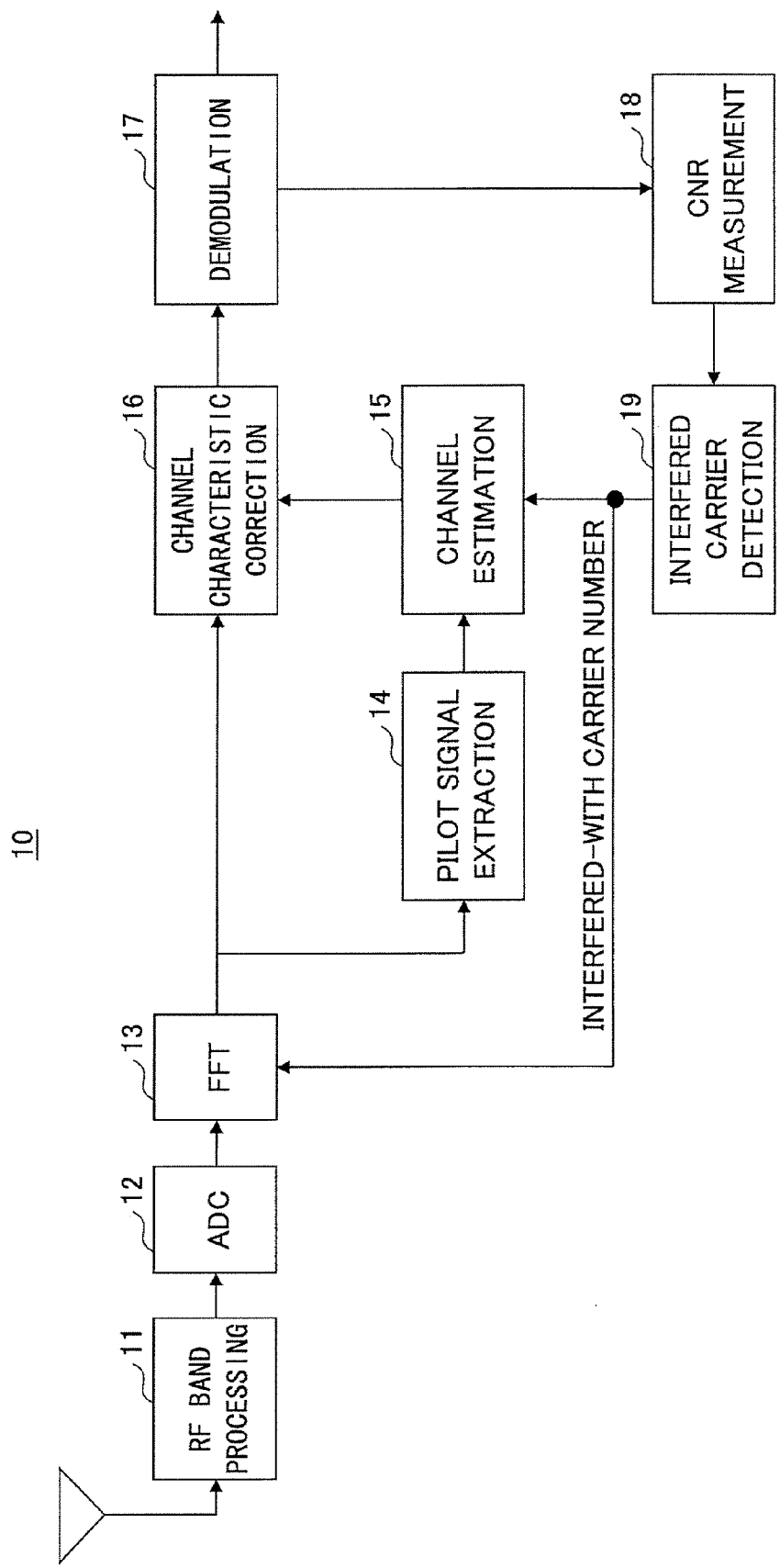

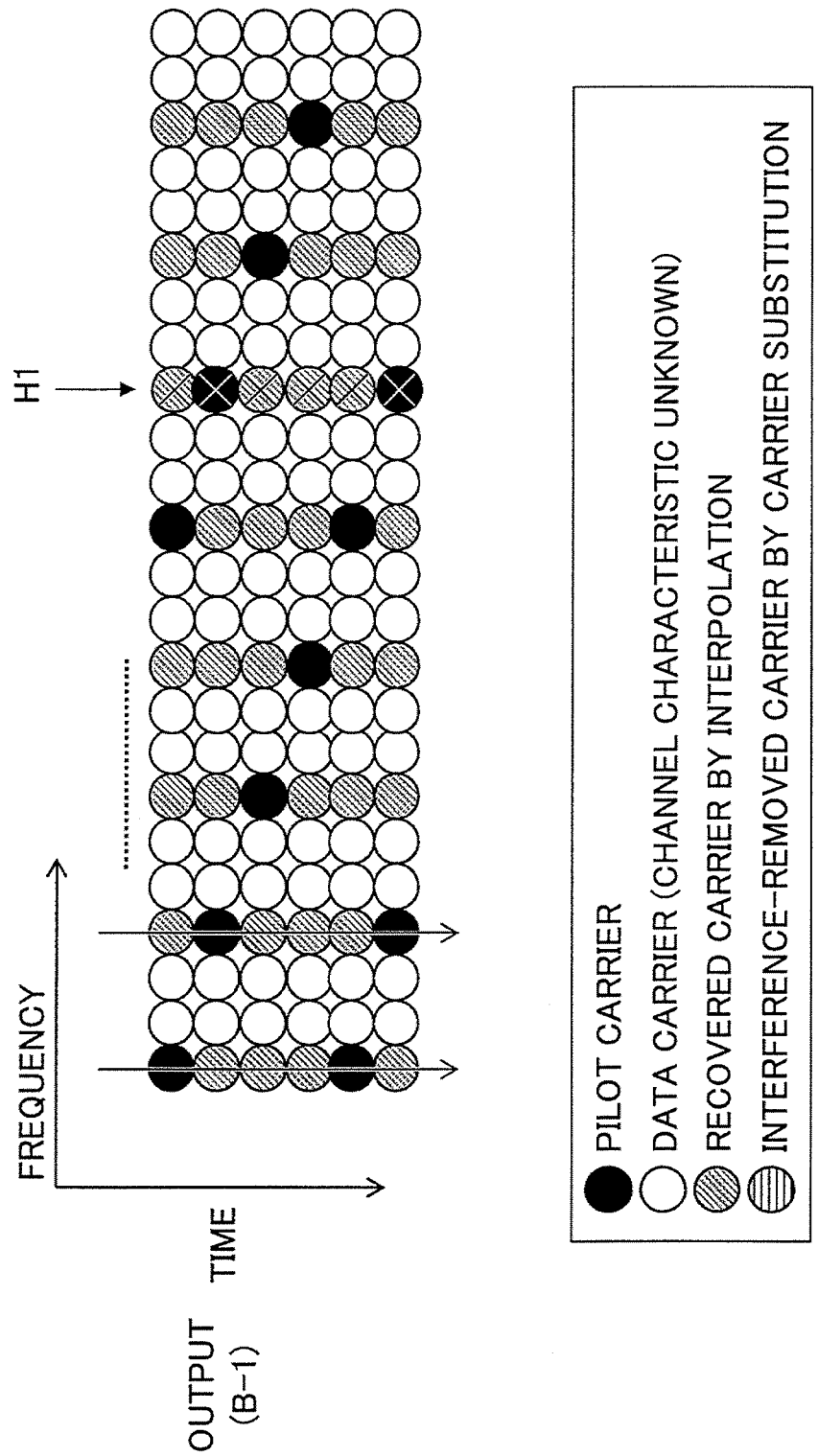

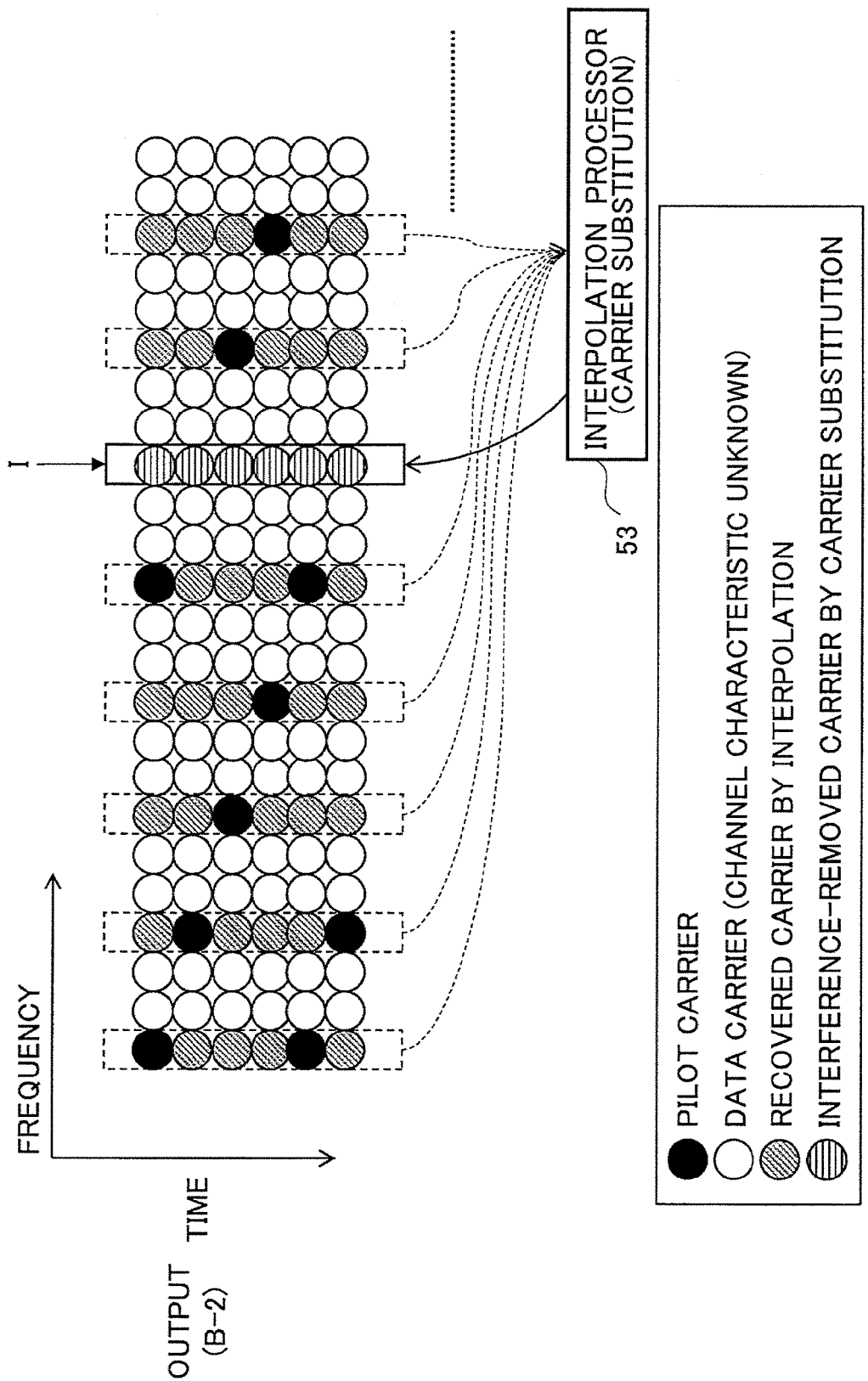

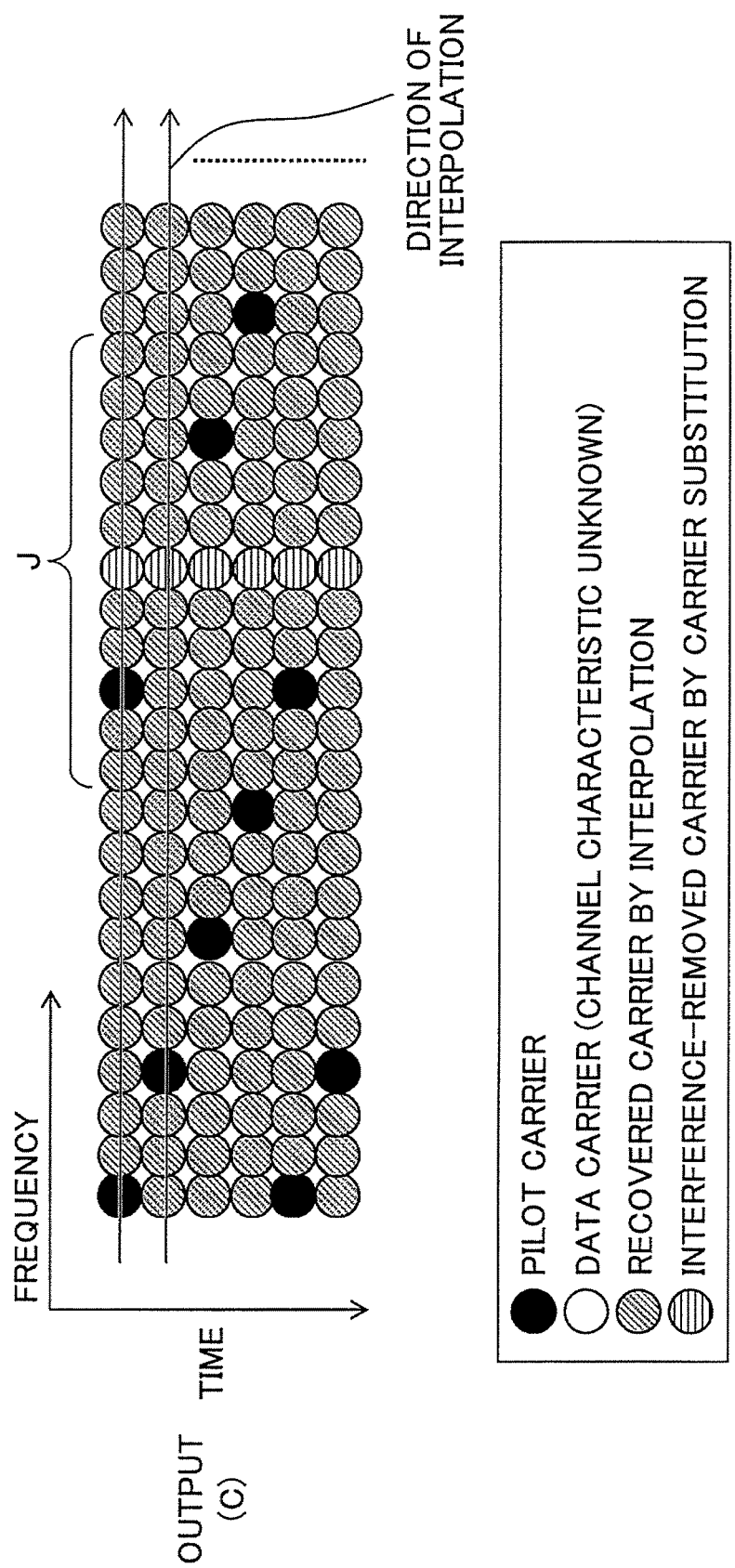

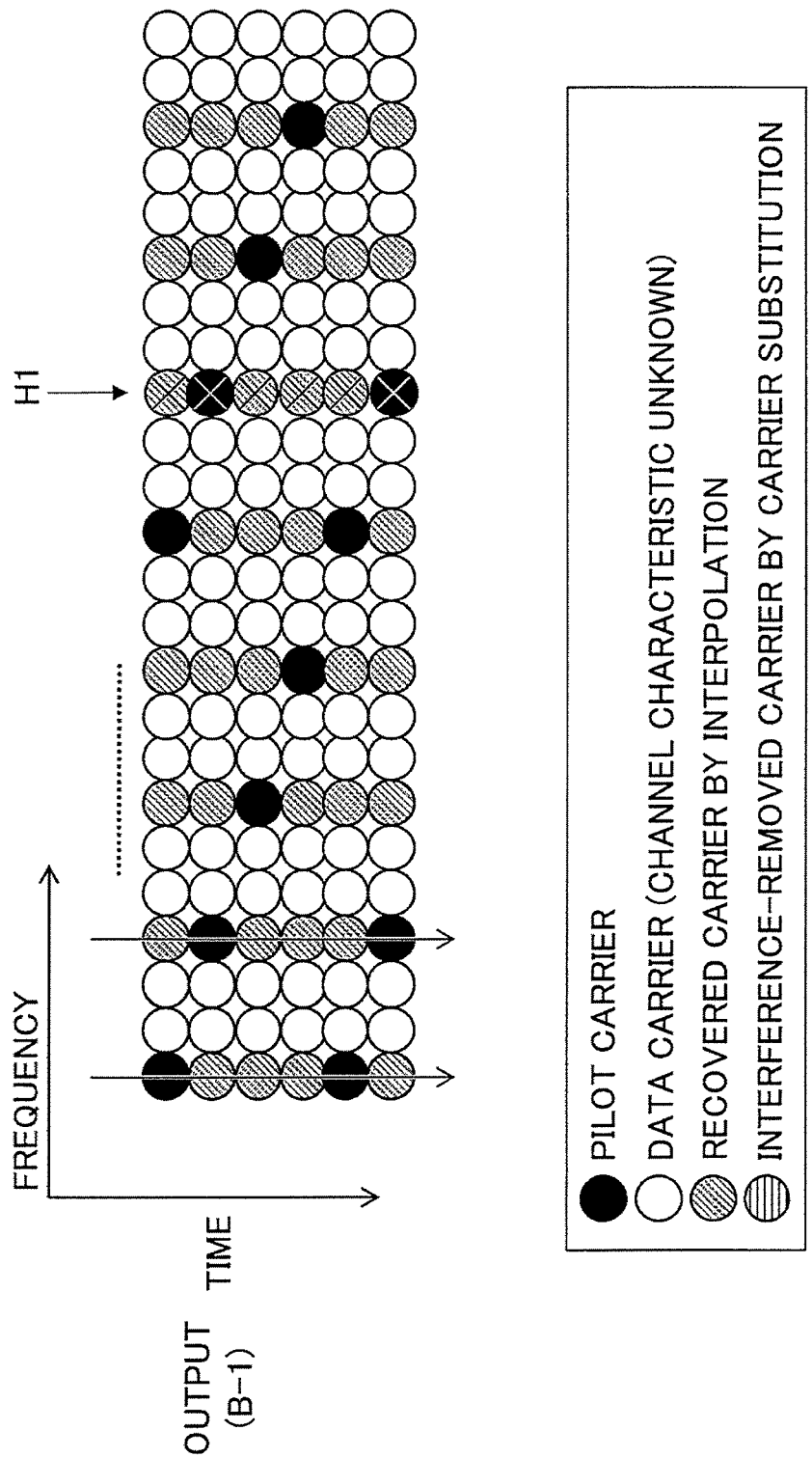

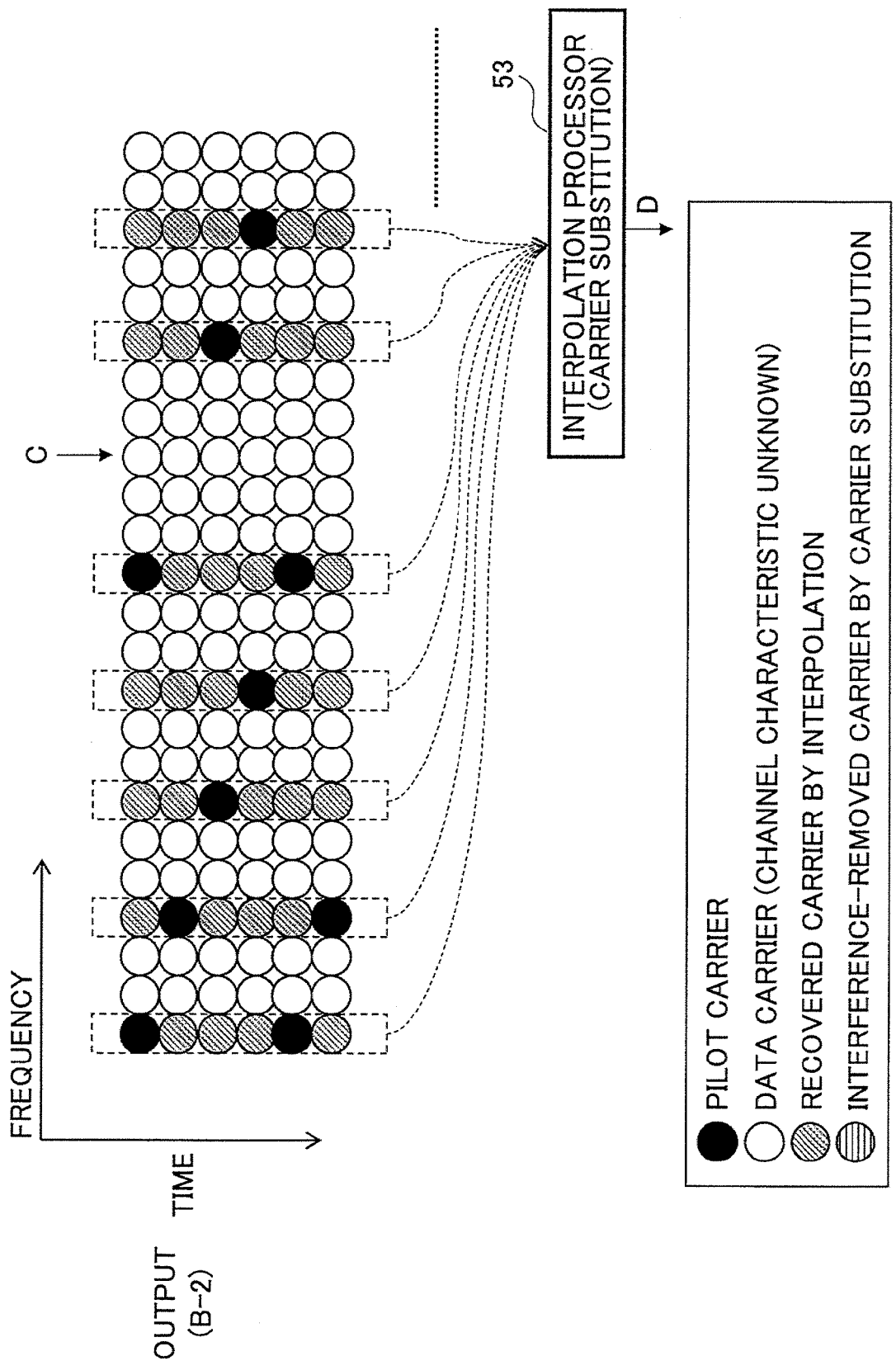

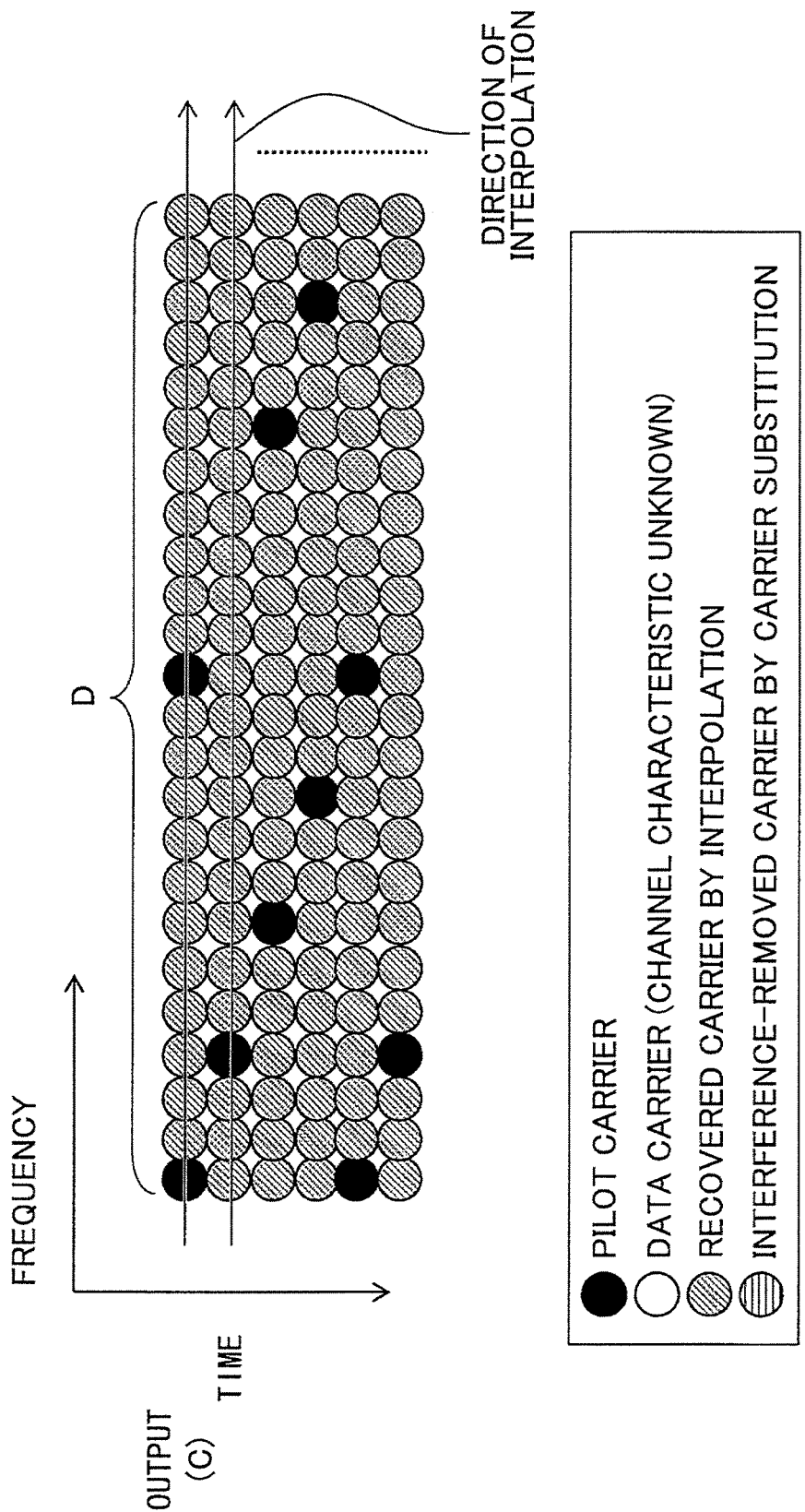

RECEIVER AND SIGNAL PROCESSING METHOD

CROSS REFERENCE TO RELATED APPLICATIONS

This application is based upon and claims benefit of priority of Japanese Patent Application No. 2013-070347 filed Mar. 28, 2013, which is incorporated herein by reference in its entirety.

FIELD

The embodiments discussed herein are related to a receiver and a signal processing method.

BACKGROUND

In recent years and continuing, orthogonal frequency division multiplexing (OFDM) has been attracting attention. OFDM is robust against multipath propagation and efficient in use of frequency. In an OFDM system, multiple sub-carriers orthogonal to each other are provided in a transmission band, and data values are allocated to the amplitude and the phase of each sub-carrier to perform digital modulation. Because multiple sub-carriers are transmitted in parallel, the frequency band allocated to each sub-carrier becomes narrow. The amount of signals per symbol time is reduced, and therefore, the modulation rate is slow. Meanwhile, because of the low modulation rate, OFDM is insusceptible to multipath interference. In OFDM, an error correction technique such as interleaving and convolution coding is often employed to further reduce degradation in signal reception performance.

FIG. 1 illustrates a typical OFDM receiver 100, in which an RF band processing block 101 performs radio frequency (RF) signal processing. An analog to digital converter (A/D converter) 102 carries out analog to digital conversion. A fast Fourier transform (FFT) block 103 converts time domain signals to frequency domain signals. A pilot signal extraction block 104 extract pilot signals from the received signals. A channel estimation block 105 estimates a channel characteristic of the received data signal based upon the pilot signal. A channel characteristic correction block 106 corrects a channel distortion of the data signal based upon the estimated channel characteristic. A demodulation block 107 demodulates the corrected signal.

As illustrated in FIG. 2, in the channel estimation block 105, a phase and amplitude characteristic calculation block 111 generally calculates variations in phase and amplitude of a pilot carrier to set channel estimation values at pilot positions. Based upon the channel estimation values at the pilot positions, a time direction interpolation block 112 performs interpolation to recover carriers in the time direction. A frequency direction interpolation block 113 interpolates channel estimation values of all the carriers in the frequency direction.

In general, an RF receiver is used in electronic equipment such as cellular phones, personal computers, or peripheral devices. The RF receiver is subject to influence of interfering waves or disturbing waves of high-frequency noise from the electronic equipment. Such interfering waves are narrowband waves. If the number of sub-carriers (hereinafter, referred to simply as "carriers") subject to the interference is small, degradation in signal reception performance can be reduced by interleaving and convolution coding.

A technique for making corrections to the position of a FFT window is proposed. See, for example, Japanese Laid-open Patent Publication No. 2000-332727. In this document, the carrier number of an influenced carrier that is under the influence of disturbing waves is estimated. If a predetermined number of valid frequency blocks continue consecutively, then correction is made to the FFT window position based upon impulse response of a reference signal.

SUMMARY

According to an aspect of the embodiments, a receiver includes a detector configured to detect an interfered-with carrier from a received and demodulated signal, a fast Fourier transform computation part configured to perform fast Fourier transform to convert a time domain signal to a frequency domain signal and adjust an output power level of a desired carrier wave contained in the frequency domain signal based upon interfered carrier information representing the interfered-with carrier detected by the detector, and a channel estimation part configured to estimate a channel characteristic based upon a non-interfered-with pilot signal carried on a non-interfered-with carrier that is not subject to influence of the interfered-with carrier and an interpolation value interpolated based upon the non-interfered-with pilot signal, the non-interfered-with pilot signal being obtained by removing, based upon the interfered carrier information, an interfered-with pilot signal that is subject to the influence of the interfered-with carrier and an interpolation value interpolated based upon the interfered-with pilot signal.

The objects and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 2 is a schematic diagram of a typical channel estimation block;

FIG. 5 is a schematic diagram of a receiver according to an embodiment;

FIG. 11A illustrates an operation of the channel estimation part of FIG. 10;

FIG. 11B illustrates an operation of the channel estimation part of FIG. 10;

FIG. 11C illustrates an operation of the channel estimation part of FIG. 10;

FIG. 12A illustrates another example of operations performed in the channel estimation part of FIG. 10;

FIG. 12B illustrates another example of operations performed in the channel estimation part of FIG. 10;

FIG. 12C illustrates another example of operations performed in the channel estimation part of FIG. 10.

DESCRIPTION OF EMBODIMENTS

Figure 1:
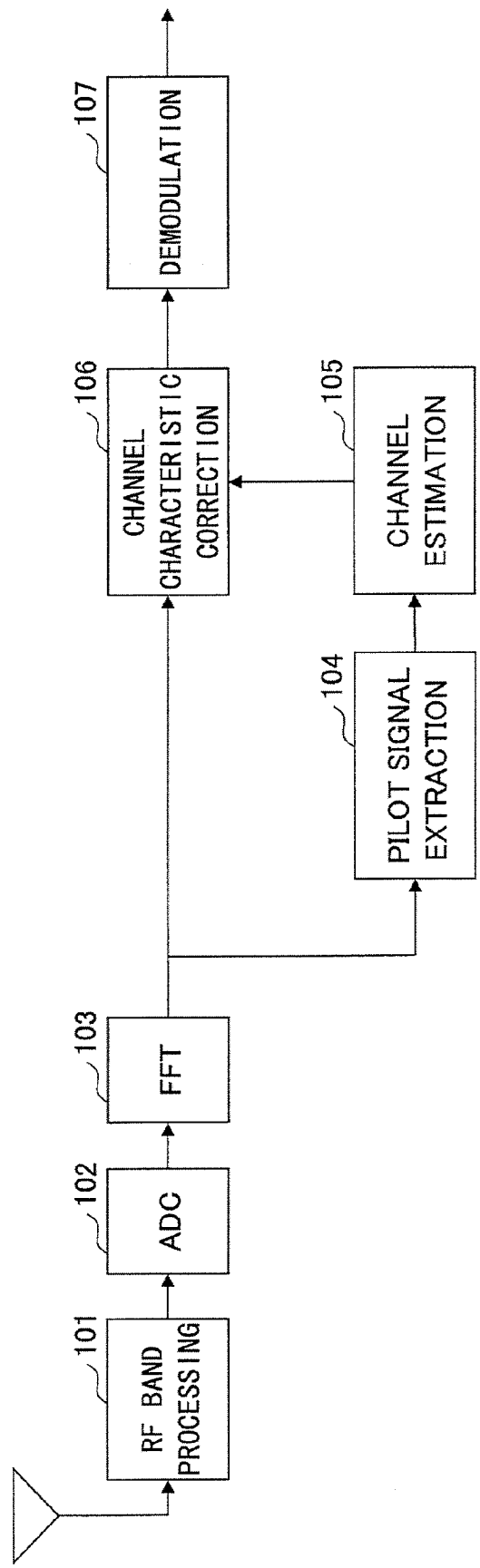
FIG. 1 is a schematic diagram of a typical OFDM receiver.
Figure 3A:
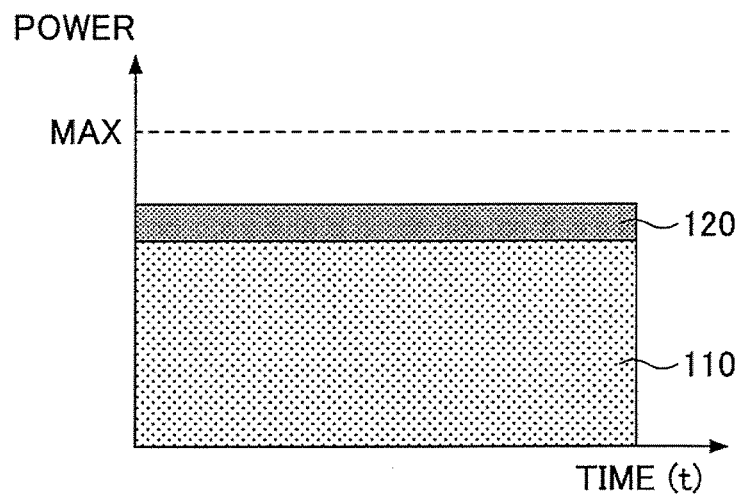
FIG. 3A is a diagram for explaining a novel technical problem arising in fast Fourier transform.
Figure 3B:
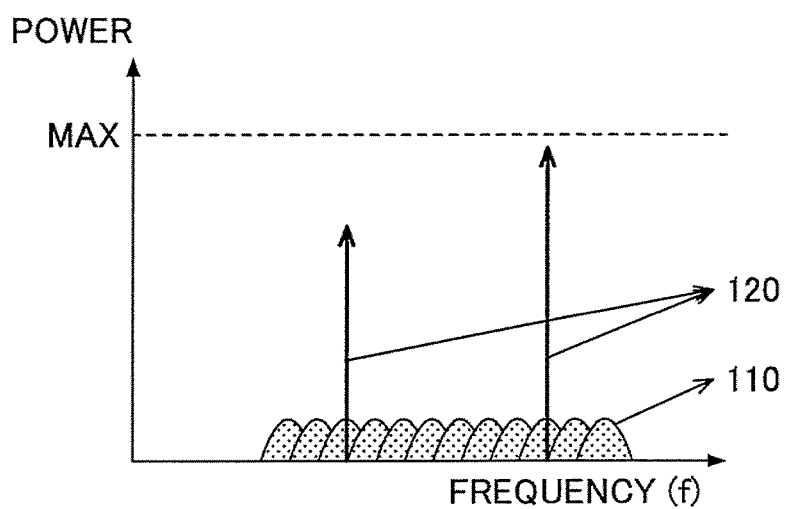
FIG. 3B is a diagram for explaining a novel technical problem arising in fast Fourier transform.

FIG. 3A and FIG. 3B illustrate a novel technical problem arising in fast Fourier transform to be solved by the embodiments. Under the situation where the bandwidth of an interfering wave is narrower than that of a desired wave, the power level of the narrow-band interfering wave 120 output in the frequency domain from a FFT block 103 may become extremely high, compared to the power level of the desired wave 110 (as illustrated in FIG. 3B), even if the power level of the interfering wave 120 input in the time domain to the FFT block 103 is lower than that of the desired wave 110 (as illustrated in FIG. 3A). In this case, focusing on the dynamic range of the frequency domain signal, an unintended interfering component (high-frequency noise) appears in the power profile of the desired wave 110. The power level of the interfering wave 120 becomes dominant (see FIG. 3B), and power level of the desired wave 110 becomes relatively low. Consequently, quantized noise is produced in the desired wave band.

Figure 4A:
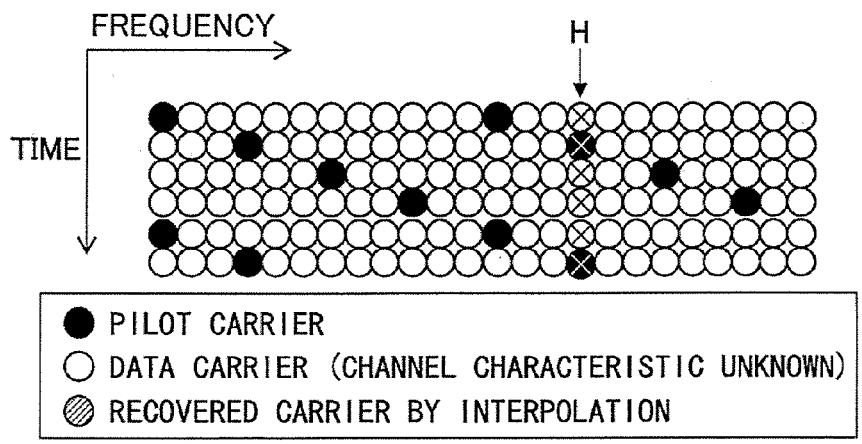
FIG. 4A is a diagram for explaining a novel technical problem arising in channel estimation.
Figure 4B:
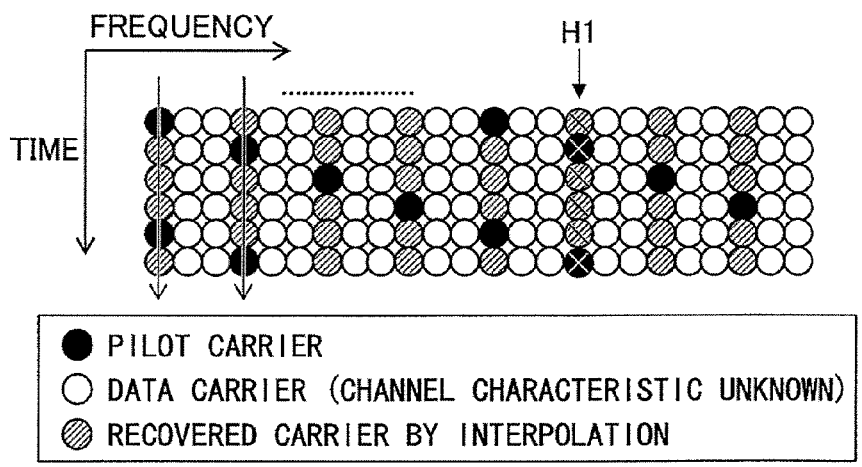
FIG. 4B is a diagram for explaining a novel technical problem arising in channel estimation.
Figure 4C:
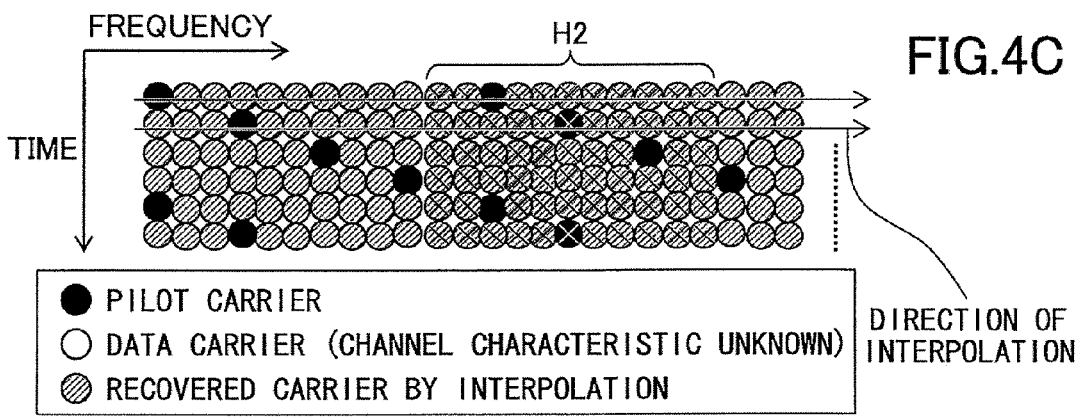
FIG. 4C is a diagram for explaining a novel technical problem arising in channel estimation.

If a dominant interfering component is contained in the FFT output, influence of the interfering wave may spread in the frequency direction during the process of channel characteristic estimation. In FIG. 4A, a pilot "H" which is greatly affected by the interfering wave is contained in the pilot carriers estimated by the phase and amplitude characteristic calculation block 111 of the channel estimation block 105. In this case, carriers "H1" under the influence of the interfering wave are interpolated in the time direction by time-direction carrier interpolation, as illustrated in FIG. 4B. The influence of the interfering wave further spreads in the frequency direction during the frequency-direction interpolation process, and a carrier group "H2" under the influence of the interfering wave is interpolated as illustrated in FIG. 4C.

This phenomenon becomes more conspicuous as the power level of the interfering wave is higher, and as the number of pilot signals used for interpolation (or the number of interpolation taps) is greater. When the number of carriers subject to the influence of the interfering wave increases, it becomes difficult to prevent degradation in the signal reception performance even if interleaving and convolution coding are performed.

Accordingly, the embodiments provide a receiver and a signal processing method that can reduce adverse effect of interfered-with carriers on desired carriers even if a narrow-band interfering wave is contained in a received signal. In this specification and claims, "interfered-with carrier" is a carrier component that is subjected to influence from other interference sources In the embodiment, the adverse effect of an interfering wave is prevented from spreading during fast Fourier transform (FFT) and channel estimation. To achieve this, a carrier number of an interfered-with carrier that is under the influence of the interfering wave is detected based upon a carrier-to-noise ratio (CNR) of each carrier. The detected carrier number (i.e., the interfered-with carrier number) is supplied to a FFT block and a channel estimation block. The FFT block and the channel estimation block perform the following operations to prevent the adverse effect of the interfered-with carrier from spreading to other carriers.

The FFT block calculates an average power level or a maximum power level of non-interfered-with carrier waves other than the interfered-with carrier (hereinafter, referred to as "desired carrier waves") based upon the interfered-with carrier number. The FFT block performs power control using the calculated power level of the desired carrier waves as an index to adjust the dynamic range of the desired carrier waves. For example, the dynamic range of the desired carrier waves contained in the output signal of the FFT block is increased as great as possible. At this time, clipping (saturation calculation) is performed because the power level of the interfered-with carrier contained in the output signal of the FFT block may exceed the maximum value of the dynamic range of the output signal. Although reproducibility of the interfered-with carrier is lost by the clipping, there is little problem because the influence of the interfering wave can be reduced by error correction such as interleaving and convolution coding.

A channel estimation block estimates an interfered-with pilot carrier that is under the influence of the interfering wave or channel-interpolated carriers, based upon the interfered-with carrier number. During the time-direction interpolation process, the channel estimation value at the carrier number of the interfered-with carrier is removed and substituted with another channel estimation value. To compensate for degradation in channel estimation accuracy due to the removal of the interfered carrier, the weighting factors or the gains for the remaining carriers are decreased or not used during the frequency-direction carrier interpolation.

FIG. 5 illustrates an example of a receiver 10 according to an embodiment. The receiver 10 is, for example, an OFDM receiver. A signal received at a receiving antenna is subject to amplification, filtering, down-conversion, and other processes in the radio frequency (RF) band processing part 11. An analog-to-digital converter (ADC) 12 converts the down-converted analog signal to a digital signal. The digitized received signal is supplied to a fast Fourier transform (FFT) computation part 13 and converted from a time domain signal to a frequency domain signal.

The FFT computation part 13 receives a carrier number of an interfered-with carrier ("interfered-with carrier number") from an interfered carrier detection part 19. Detection of the interfered-with carrier number is described in more detail below. The FFT computation part 13 controls the dynamic range of the output signal based upon the interfered-with carrier number. The frequency domain signal output from the FFT computation part 13 is supplied to both the pilot signal extraction part 14 and the channel characteristic correction part 16.

Figure 13:
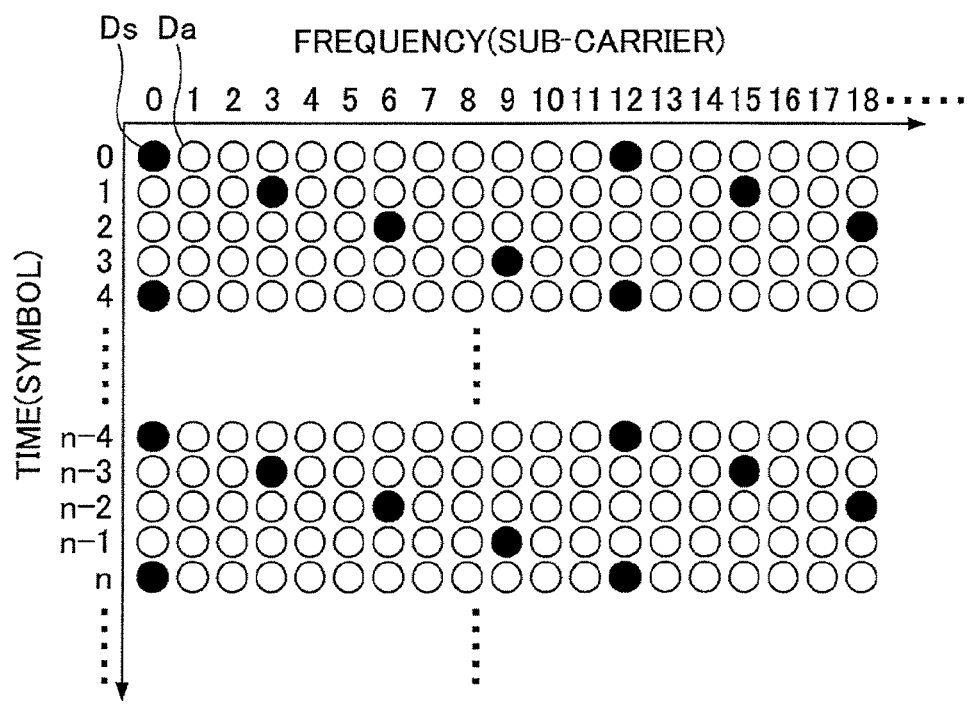
FIG. 13 illustrates an OFDM frame structure for digital terrestrial broadcasting.

The pilot signal extraction part 14 extracts a pilot signal carried on a known pilot carrier from the post-FFT frequency domain signal. One example of OFDM sub-carrier arrangement is illustrated in FIG. 13, which example is an OFDM frame of integrated service digital broadcasting-terrestrial (ISDB-T). In FIG. 13, white circles "$D_a$" represent data carriers, which carry data signals transmitted from a sender side.

Black circles "$D_s$" represent pilot carriers for carrying known signals (pilot signals) defined by the technical standard.

Returning to FIG. 5, the pilot signals extracted at the pilot signal extraction part 14 are input to the channel estimation part 15. The channel estimation part 15 estimates channel characteristic values of the pilot carrier positions based upon the variations in the phase and the amplitude of the pilot signals. The channel estimation part 15 also estimates channel characteristic values of data carrier positions by interpolating channel characteristic values between pilot signals. During the channel estimation, the channel estimation part 15 carries out a process for removing the influence of the interference based upon the interfered-with carrier number reported from the interfered carrier detection part 19.

The channel characteristic values estimated by the channel estimation part 15 are input to the channel characteristic correction part 16. The channel characteristic correction part 16 compensates for channel distortion in the frequency domain signal using the estimated channel characteristic values. The signal having been subject to channel distortion compensation is supplied to the demodulation part 17.

The demodulation part 17 performs demapping for estimating transmission points of the modulated signal, followed by deinterleaving and error correction to acquire demodulated data sequences and CNR values of the respective carriers. The CNR value may be expressed as a modulation error ratio (MER) measured by the demodulation part 17 or a phase rotation error of the pilot signal. The CNR values acquired by the demodulation part 17 are supplied to a CNR measurement part 18 to determine an average CNR value of each carrier by averaging in the time direction. The average CNR value of each carrier is supplied to an interfered carrier detection part 19.

The interfered carrier detection part 19 estimates an interfered-with carrier under the influence of the interfering wave exceeding an acceptable level, based upon the status of the CNR values of the respective carriers. The carrier number of the interfered-with carrier is reported from the interfered carrier detection part 19 to the FFT computation part 13 and the channel estimation part 15. If the source of the interfering wave is known, the carrier number of a carrier to be subject to the influence of the interfering wave may be recorded in advance as an interfered-with carrier number. For example, if the frequency band of the disturbing wave is known, the carrier number corresponding to that frequency band may be recorded in advance as the interfered-with carrier number.

The FFT computation part 13 and the channel estimation part 15 perform the following processes on the interfered-with carrier, based upon the reported interfered-with carrier number, to prevent degradation due to the interfering wave.

<Configuration Example 1 of FFT Computation Part>

Figure 6:
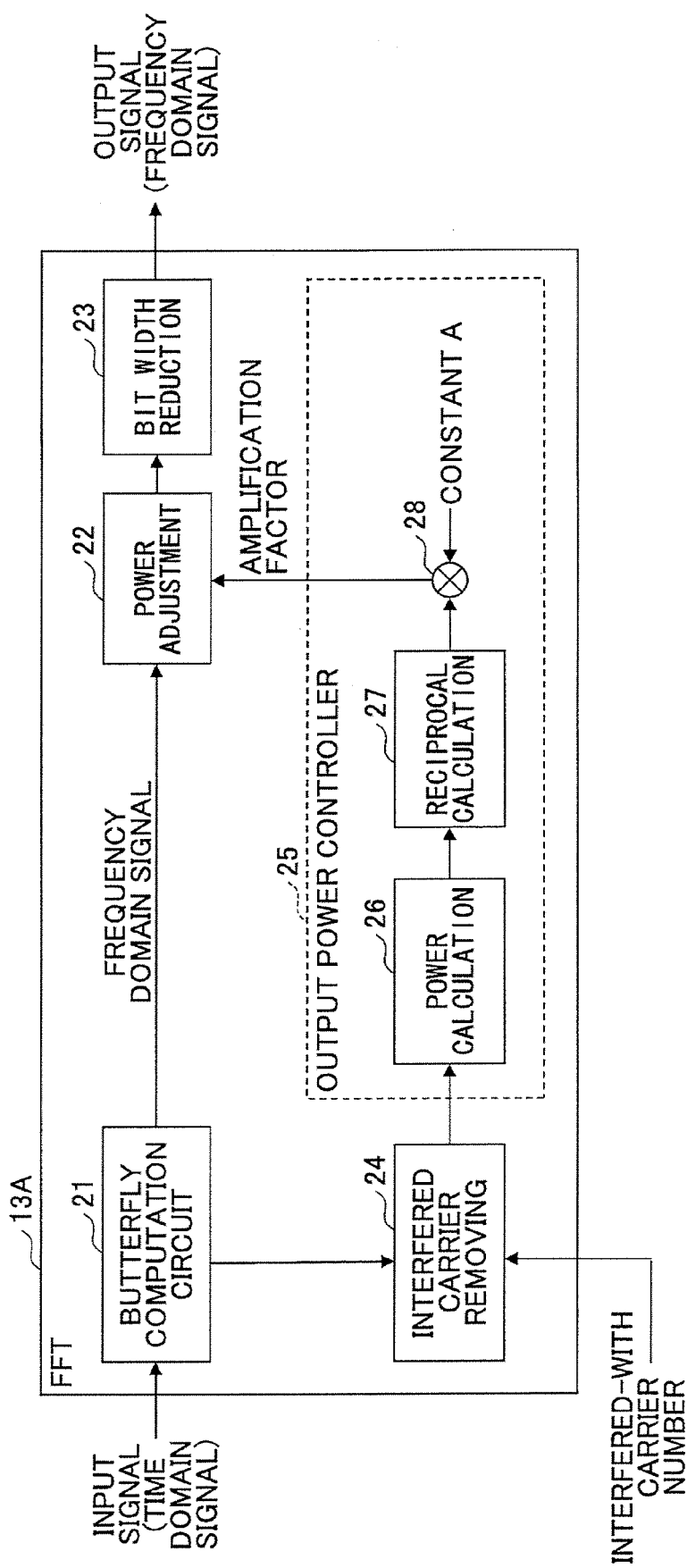
FIG. 6 illustrates a first example of a FFT computation part used in the receiver of the embodiment.

FIG. 6 illustrates a FFT computation part 13A as the first configuration example. The FFT computation part 13A supplies an inputted time domain signal to a butterfly computation circuit 21 to convert the time domain signal to a frequency domain signal through butterfly computation. The bit width of the output signal of the butterfly computation circuit 21 is greater than the bit width of the output signal from the FFT computation part 13A. It is assumed that there is no clipping or quantized noise existing in the interfered-with carrier or the desired carrier at the point of output from the butterfly computation circuit 21.

The output signal from the butterfly computation circuit 21 is supplied to an interfered carrier removing part 24 and a power adjustment part 22. The interfered carrier removing part 24 removes interfered-with carriers that are subject to the influence of the interfering wave, based upon the interfered-with carrier number reported from the interfered carrier detection part 19. After the removal, the rest of the carriers are supplied to an output power controller 25. The output power controller 25 generates control information (e.g., gain or amplification factor) for optimizing the dynamic range of the output signal of the FFT computation part 13A, and supplies the control information to the power adjustment part 22.

The output power controller 25 has a power calculation part 26. The power calculation part 26 calculates the maximum power level of the inputted carrier signals. A reciprocal calculation part 27 calculates a reciprocal of the maximum power level. By calculating the reciprocal of the maximum power level, the gain is reduced when the inputted power level is high, and the gain is increased when the inputted power level is low. A multiplier 28 multiplies the reciprocal of the maximum power level by a constant "A" to output a gain to the power adjustment part 22. The constant "A" is set to the optimum value such that the power level of the carrier signals inputted to the output power controller 25 is not clipped or saturated on the dynamic range of the output of the FFT computation part 13.

The power adjustment part 22 adjusts the power level (or the dynamic range) of the frequency domain signal output from the butterfly computation circuit 21, based upon the gain (or the amplification factor) supplied from the output power controller 25. A bit width reduction part 23 reduces the bit width of the power-adjusted signal and outputs the frequency domain signal.

Figure 7A:
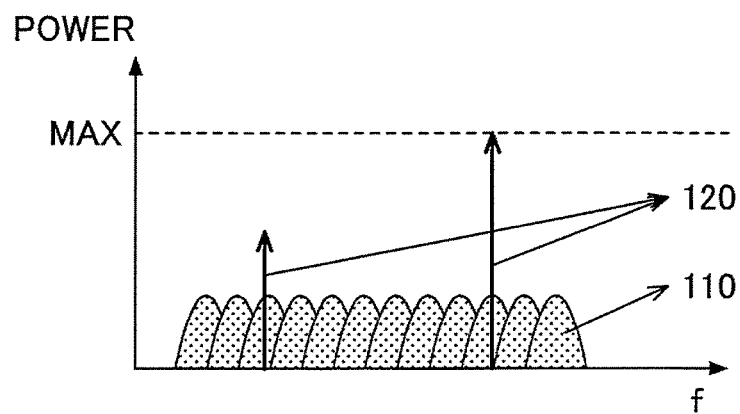
FIG. 7A illustrates an output signal of conventional FFT computation without taking interfered-with carriers into account.
Figure 7B:
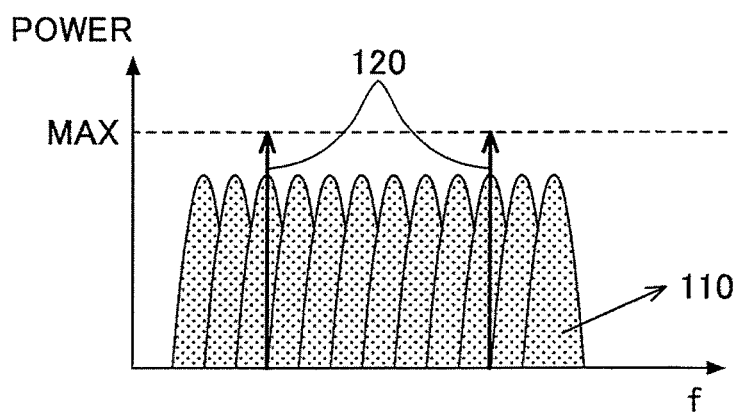
FIG. 7B illustrates an output signal of the FFT computation part of the embodiment where output power control is performed.

FIG. 7A and FIG. 7B are diagrams to explain the effect of the embodiment. FIG. 7B illustrates an example of the output signal of the FFT computation part 13A where output power control is performed by the output power controller 25 and the power adjustment part 22. If interfered-with carrier components are not taken into account as in the conventional art, the output signal of typical FFT computation contains interfered-with carriers 120 of significant levels, as illustrated in FIG. 7A. In this case, the dynamic range of the output of the FFT computation relies on the power level of the interfered-with carrier 120 and the amplitude of the desired wave 110 becomes small. Consequently, quantized noise is produced.

In contrast, with the FFT structure of the embodiment, the amplitudes of the desired carriers are increased even if interfered-with carriers 120 exist, and the dynamic range in accordance with the power level of the desired waves 110 is selected. Because the dynamic range of the output signal of the FFT computation part 13A relies on the desired waves 110, quantized noise is reduced in the desired waves 110.

<Configuration Example 2 of FFT Computation Part>

Figure 8:
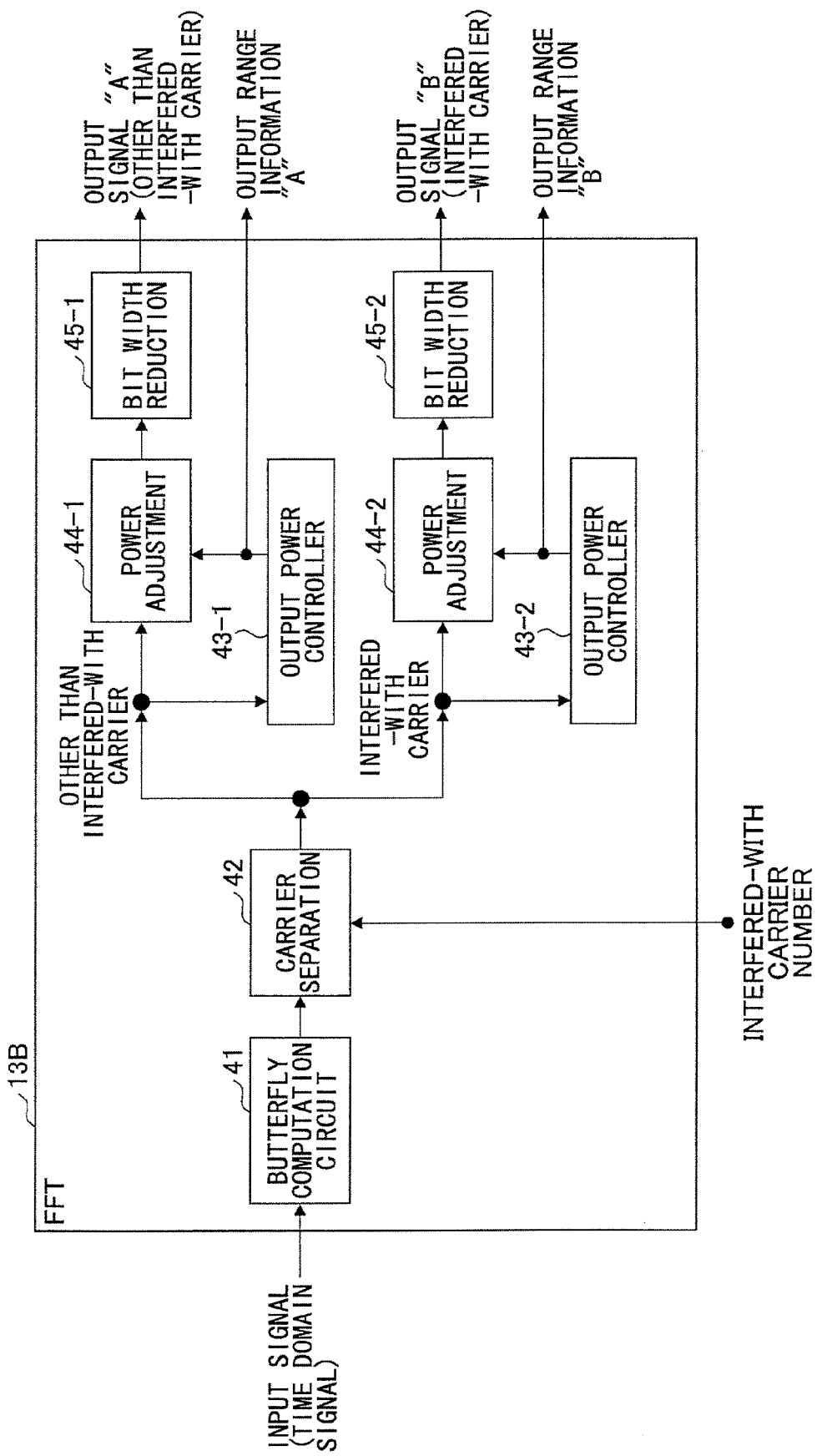
FIG. 8 illustrates a second example of a FFT computation part used in the receiver of the embodiment.

FIG. 8 illustrates a FFT computation part 13B as the second configuration example. The FFT computation part 13B has a carrier separation part 42 that separates an interfered-with carrier group from the rest of the carrier(s).

The FFT computation part 13A illustrated in FIG. 6 is based upon the assumption that the dynamic ranges of all the carriers are the same. On the other hand, the second example of FIG. 8 is addressed to the case in which the dynamic range is set separately for each of the carriers (by, for example, expressing signals with floating points). In this case, input signals can be separated into two groups, namely, an interfered-with carrier group and the rest of the carriers (other than the interfered-with carrier). The dynamic range can be set for each of the carrier groups.

In the FFT computation part 13B of the second example, after butterfly computation at the butterfly computation part 41, the carrier separation part 42 separates the input signal into a non-interfered-with carrier group including carriers other than interfered-with carriers (output signal "A") and an interfered-with carrier group (output signal "B"). Output power controllers 43-1 and 43-2, power adjustment parts 44-1 and 44-2, and bit width reducing parts 45-1 and 45-2 are provided to the respective groups to determine the dynamic ranges of the corresponding output signals.

The FFT computation part 13B outputs dynamic range information items A and B, in addition to signal A (for those carriers other than the interfered-with carriers) and signal B (for the interfered-with carriers), which signals have been power-controlled at the respective dynamic ranges.

Figure 9:
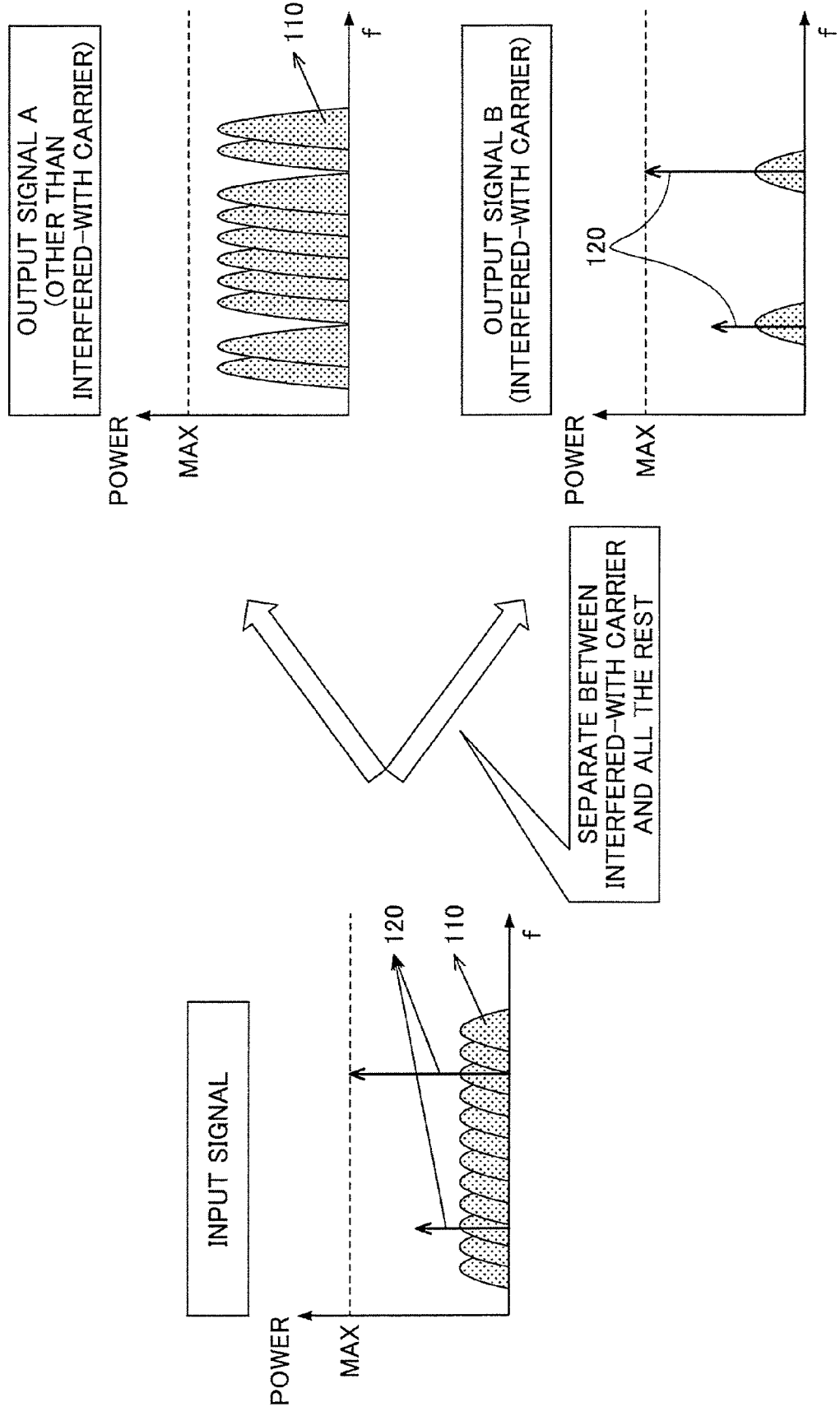
FIG. 9 illustrates output power control performed in the FFT computation part of FIG. 8.

FIG. 9 illustrates an example of the output signal of the FFT computation part 13B. In this figure, the desired waves 110 and the interfering waves 120 are output separately at the respective dynamic ranges. The level "MAX" illustrated in the chart of the output signal A corresponds to the dynamic range information "A" in FIG. 8. The level "MAX" illustrated in the chart of the output signal B corresponds to the dynamic range information "B" in FIG. 8. By separating the dynamic range of the output signal of the FFT computation part 13B into one for the non-interfered-with carrier (output signal A) and one for the interfered-with carrier (output signal B), quantized noise in the desired wave is prevented, and clipping of the interfered-with carrier can be prevented.

In place of the interfered-with carrier number, the total number of interfered carriers may be used in the FFT computation part 13A or 13B. For example, if N interfered-with carriers exist, it may be assumed that the interfered-with carriers under the influence of interference are from the first carrier with the maximum power level to the $N_{th}$ carrier with the $N_{th}$ highest power level, and that the desired carrier waves are the $(N+1)_{th}$ carrier with the $(N+1)_{th}$ highest power level and all the subsequent carriers among all the carriers. In this example, the interfered carrier removing part 24 of FIG. 6 removes those carriers with the first through $N_{th}$ power levels as interfered-with carriers, and the power calculation part 26 calculates the average power level or the maximum power level of those carriers with the $(N+1)_{th}$ and the subsequent power levels as the desired carrier waves. With the arrangement of FIG. 8, the carrier separation part 42 separates those carriers with the maximum to the $N_{th}$ power levels as a interfered-with carrier group (output signal B) from the rest of the carriers with the $(N+1)_{th}$ and the subsequent power levels as a non-interfered-with carrier group (output signal A).

<Configuration Example of Channel Estimation Part>

Figure 10:
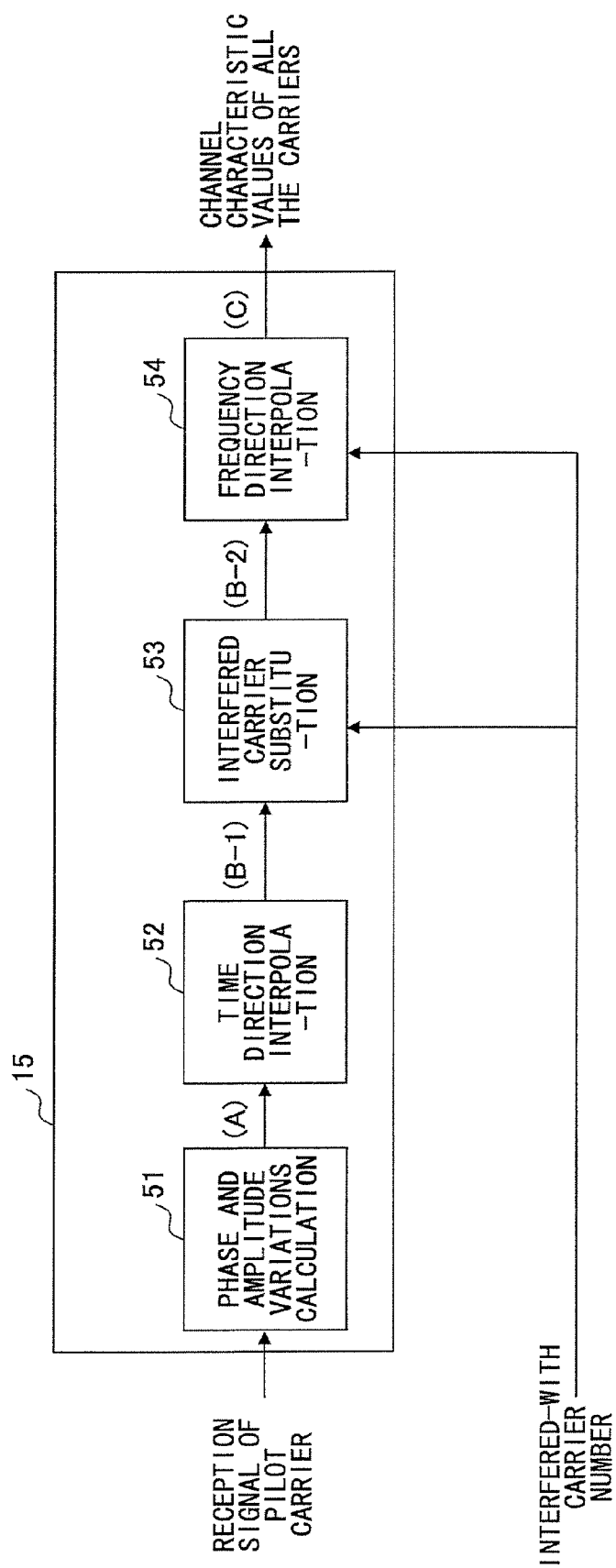
FIG. 10 is a schematic diagram of a channel estimation part used in the receiver of the embodiment.

FIG. 10 illustrates a configuration example of the channel estimation part 15. A pilot signal is extracted from the output signal of the FFT computation part 13 by the pilot signal extraction part 14, and supplied to the channel estimation part 15. The pilot signal is input to the phase and amplitude variations calculation part 51 to determine the channel estimation value at each position of the pilot carrier. The output (A) from the phase and amplitude variations calculation part 51 represents the channel estimation value at the pilot carrier position. The output (A) corresponds to the pilot position estimation values illustrated in FIG. 4A. The output (A), namely, the channel estimation value at the pilot carrier position is input to a time direction interpolation part 52 to recover carriers by interpolation in the time direction. The time-direction interpolated carriers are supplied to an interfered carrier substitution part 53. The output (B-1) representing the interpolated carrier arrangement supplied to the interfered carrier substitution part 53 corresponds to the interpolated carrier arrangement illustrated in FIG. 4B.

The interfered carrier substitution part 53 detects a pilot carrier under the influence of the interfering wave based upon the interfered-with carrier number reported by the interfered carrier detection part 19, and the interpolated carriers recovered based upon the interfered-with pilot carrier. Then, the interfered carrier substitution part 53 substitutes the channel estimation values of the carriers under the influence of interference with interpolation values based upon the channel estimation values of the non-interfered-with carriers. The output (B-2) of the interfered carrier substitution part 53 represents the substituted channel estimation values. The output (B-2) is supplied to a frequency domain interpolation part 54.

The frequency domain interpolation part 54 carries out interpolation in the frequency direction to determine channel characteristics at positions of data carriers whose channel characteristics are unknown. The output (c) of the frequency domain interpolation part 54 represents the channel characteristic values interpolated in the frequency direction.

FIG. 11A through FIG. 11C illustrate the operations performed by the channel estimation part 15. FIG. 11A illustrates the output (B-1) from the time direction interpolation part 52. The output (B-1) contains interfered-with carriers H1 in the time direction, which carriers are under the influence of interfering wave. FIG. 11B illustrates the output (B-2) from the interfered carrier substitution part 53. The interfered carrier substitution part (or an interpolation processor) 53 substitutes the channel characteristic values of the interfered-with carriers H1 with a set of channel characteristic values of non-interfered-with pilot carriers (other than the interfered carriers) and the interpolated values recovered based upon the non-interfered pilot carriers. A set of the substitute values "I" is created from carrier signals with less interference, and accordingly, influence of the interfering wave can be removed.

After the removal of the influence of interference, the second interpolation is performed in the frequency direction. FIG. 11C illustrates the output (C) from the frequency direction interpolation part 54, in which channel characteristic values are estimated for the interpolated carrier set "J" with little influence of interference. In this manner, the adverse influence of the interfering waves is prevented from spreading in the frequency direction, and the problem in the conventional technique can be solved.

The interfered carrier substitution part 53 may insert zero values in the channel characteristic estimation values of the interfered-with carriers. This operation is illustrated in FIG. 12A through FIG. 12C.

FIG. 12A illustrates output (B-1), which is connected to the input of the interfered carrier substitution part 53. Similarly to FIG. 11A, interfered-with carriers H1 under the influence of interfering wave are contained in the time direction. FIG. 12B illustrates output (B-2) from the interfered carrier substitution part 53, in which the channel characteristic values at the interfered-with carriers H1 under the influence of interference are substituted with zero values. As a result of this operation, a set of zero carriers C is arranged in the time direction.

FIG. 12C illustrates output (C) of the frequency direction interpolation part 54, in which interpolation has been made in the frequency direction using the non-interfered-with pilot carriers and the interpolated carriers recovered based upon the non-interfered-with pilot carriers. By this operation, a set of channel estimation values D of all the data carriers are acquired based upon the estimation values of the non-interfered-with carriers (i.e., those carriers other than the interfered-with carriers). The channel estimation values "D" are output from the channel estimation part 15.

With the receiver of the embodiments, adverse effect of narrow-band interfering waves, whose power levels are higher than that of the desired signal, can be removed. During channel estimation, the influence of the interfered-with carriers is prevented from spreading in the frequency direction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:

1. A receiver comprising:
   a detector configured to detect an interfered-with carrier from a received and demodulated signal,
   a fast Fourier transform computation part configured to perform fast Fourier transform to convert a time domain signal to a frequency domain signal and adjust an output power level of a desired carrier wave contained in the frequency domain signal based upon interfered carrier information representing the interfered-with carrier detected by the detector, and
   a channel estimation part configured to estimate a channel characteristic based upon a non-interfered-with pilot signal carried on a non-interfered-with carrier that is not subject to influence of the interfered-with carrier and an interpolation value interpolated based upon the non-interfered-with pilot signal, the non-interfered-with pilot signal being obtained by removing, based upon the interfered carrier information, an interfered-with pilot signal that is subject to the influence of the interfered-with carrier and an interpolation value interpolated based upon the interfered-with pilot signal.

2. The receiver according to claim 1, wherein the fast Fourier transform computation part comprises
   a power controller that clips a power level of the interfered-with carrier based upon an average power level or a maximum power level of the desired carrier wave to expand an output dynamic range of the desired carrier wave.

3. The receiver according to claim 1, wherein the fast Fourier transform computation part comprises
   a separation part configured to separate the frequency domain signal into a group of interfered-with carriers and a group of non-interfered-with carriers, and
   a power controller configured to adjust an output dynamic range for each of the interfered-with carrier group and the non-interfered-with carrier group.

4. The receiver according to claim 1, wherein the channel estimation part comprises
   a substitution part configured to substitute an estimation value interpolated in a time direction based upon the interfered-with pilot signal with an estimation value interpolated in the time direction based upon the non-interfered-with pilot signal, and perform interpolation in a frequency direction after the substitution.

5. The receiver according to claim 1, wherein the channel estimation part comprises
   a substitution part configured to insert a zero value in an estimation value interpolated in a time direction based upon the interfered-with pilot signal, and perform interpolation in a frequency direction based upon an estimation value interpolated in the time direction based upon the non-interfered-with pilot signal.

6. The receiver according to claim 1,
   wherein the detector is configured to report an interfered-with carrier number to the fast Fourier transform computation part and the channel estimation part, and
   wherein the fast Fourier transform part is configured to calculate a power level of the desired carrier wave of the frequency domain signal based upon the interfered-with carrier number and optimize a dynamic range of the desired carrier wave based upon the calculated power level.

7. The receiver according to claim 1,
   wherein the detector is configured to report a number of one or more interfered-with carriers to the fast Fourier transform computation part and the channel estimation part, and
   wherein the fast Fourier transform computation part is configured to, if the number of the interfered carriers is N, handle carriers with first to $N_{th}$ highest power levels as the interfered-with carrier, and handle carriers with $(N+1)_{th}$ power level and the subsequent power levels as desired carriers.

8. The receiver according to claim 1, wherein the detector is configured to, if an interference source and a frequency band of the interference source are known, record a carrier number corresponding to the frequency band as a part of the interfered-with carrier.

9. A signal processing method comprising:
   detecting an interfered-with carrier from a received and demodulated signal,
   reporting the detected interfered-with carrier to a fast Fourier transform computation part and a channel estimation part of a receiver;
   at the fast Fourier transform computation part, adjusting an output power level of a desired carrier wave contained in a frequency domain signal based upon the reported interfered-with carrier; and
   at the channel estimation part, removing, based upon the interfered-with carrier, an interfered-with pilot signal that is subject to the influence of the interfered-with carrier and an interpolation value interpolated based upon the interfered-with pilot signal from a pilot signal contained in the frequency domain signal to estimate a channel characteristic based upon a non-interfered-with pilot signal that is not subject to influence of the interfered-with carrier and an interpolation value interpolated based upon the non-interfered-with pilot signal.

10. The signal processing method according to claim 9, further comprising:
    at the fast Fourier transform computation part, clipping a power level of the interfered-with carrier based upon an average power level or a maximum power level of the desired carrier wave to expand an output dynamic range of the desired carrier wave.

11. The signal processing method according to claim 9, further comprising:
    at the fast Fourier transform computation part, separating the frequency domain signal into a group of interfered-with carriers and a group of non-interfered-with carriers, and
    adjusting an output dynamic range for each of the interfered-with carrier group and the non-interfered-with carrier group.

12. The signal processing method according to claim 9, further comprising:
    at the channel estimation part, substituting an estimation value interpolated in a time direction based upon the interfered-with pilot signal with an estimation value interpolated in the time direction based upon the non-interfered-with pilot signal, and performing interpolation in a frequency direction after the substitution.

13. The signal processing method according to claim 9, further comprising:
at the channel estimation part, inserting a zero value in an estimation value interpolated in a time direction based upon the interfered-with pilot signal, and
performing interpolation in a frequency direction based upon an estimation value interpolated in the time direction based upon the non-interfered-with pilot signal.

14. The signal processing method according to claim 9, further comprising:
reporting an interfered-with carrier number to the fast Fourier transform computation part and the channel estimation part, and
at the fast Fourier transform part, calculating a power level of the desired carrier wave of the frequency domain signal based upon the interfered-with carrier number, and
optimizing a dynamic range of the desired carrier wave based upon the calculated power level.

15. The signal processing method according to claim 9, further comprising;
reporting a number of one or more interfered-with carriers to the fast Fourier transform computation part and the channel estimation part, and
if the number of the interfered-with carriers is N, handling carriers with first to $N_{th}$ highest power levels as the interfered-with carriers, while handling carriers with $(N+1)_{th}$ power level and the subsequent power levels as desired carriers.

16. The signal processing method according to claim 9, further comprising:
if an interference source and a frequency band of the interference source are known, recording in advance a carrier number corresponding to the frequency band as a part of the interfered-with carrier.

* * * * *